United States Patent
Takahashi

(10) Patent No.: US 7,382,493 B2
(45) Date of Patent: Jun. 3, 2008

(54) IMAGE PROCESSING FOR OPTIMAL COLOR DENSITY DECOMPOSITION BASED ON CALCULATED GRAININESS AND EQUILUMINANCE CONTOURS

(75) Inventor: Kosei Takahashi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 863 days.

(21) Appl. No.: 10/900,682

(22) Filed: Jul. 27, 2004

(65) Prior Publication Data

US 2005/0024660 A1 Feb. 3, 2005

(30) Foreign Application Priority Data

Jul. 30, 2003 (JP) ............... 2003-282856

(51) Int. Cl.
*H04N 1/56* (2006.01)
*H04N 1/60* (2006.01)

(52) U.S. Cl. ............... 358/1.9; 358/504; 358/515; 358/518; 358/521

(58) Field of Classification Search .............. 358/1.9, 358/2.1, 504, 515, 518–521; 382/162, 167
See application file for complete search history.

(56) References Cited

U.S. PATENT DOCUMENTS

| 7,057,756 B2 | 6/2006 | Ogasahara |
| 7,123,391 B2 | 10/2006 | Saito |
| 2005/0024656 A1* | 2/2005 | Takahashi et al. ........... 358/1.9 |
| 2007/0291312 A1* | 12/2007 | Kaneko et al. .............. 358/2.1 |

FOREIGN PATENT DOCUMENTS

| JP | 01253454 A | * 10/1989 |
| JP | 2002-059571 | 2/2002 |
| JP | 2002-248838 A | 9/2002 |
| JP | 2003-080682 | 3/2003 |
| JP | 2003-110864 A | 4/2003 |

* cited by examiner

*Primary Examiner*—Scott A. Rogers
(74) *Attorney, Agent, or Firm*—Canon U.S.A. Inc., IP Division

(57) ABSTRACT

Graininess and calorimetric values of color patches formed by an image generating system using dark and light colored recording agents are input to calculate equiluminance contours. Color density decomposition is then performed based on the calculated graininess and equiluminance contours.

15 Claims, 10 Drawing Sheets

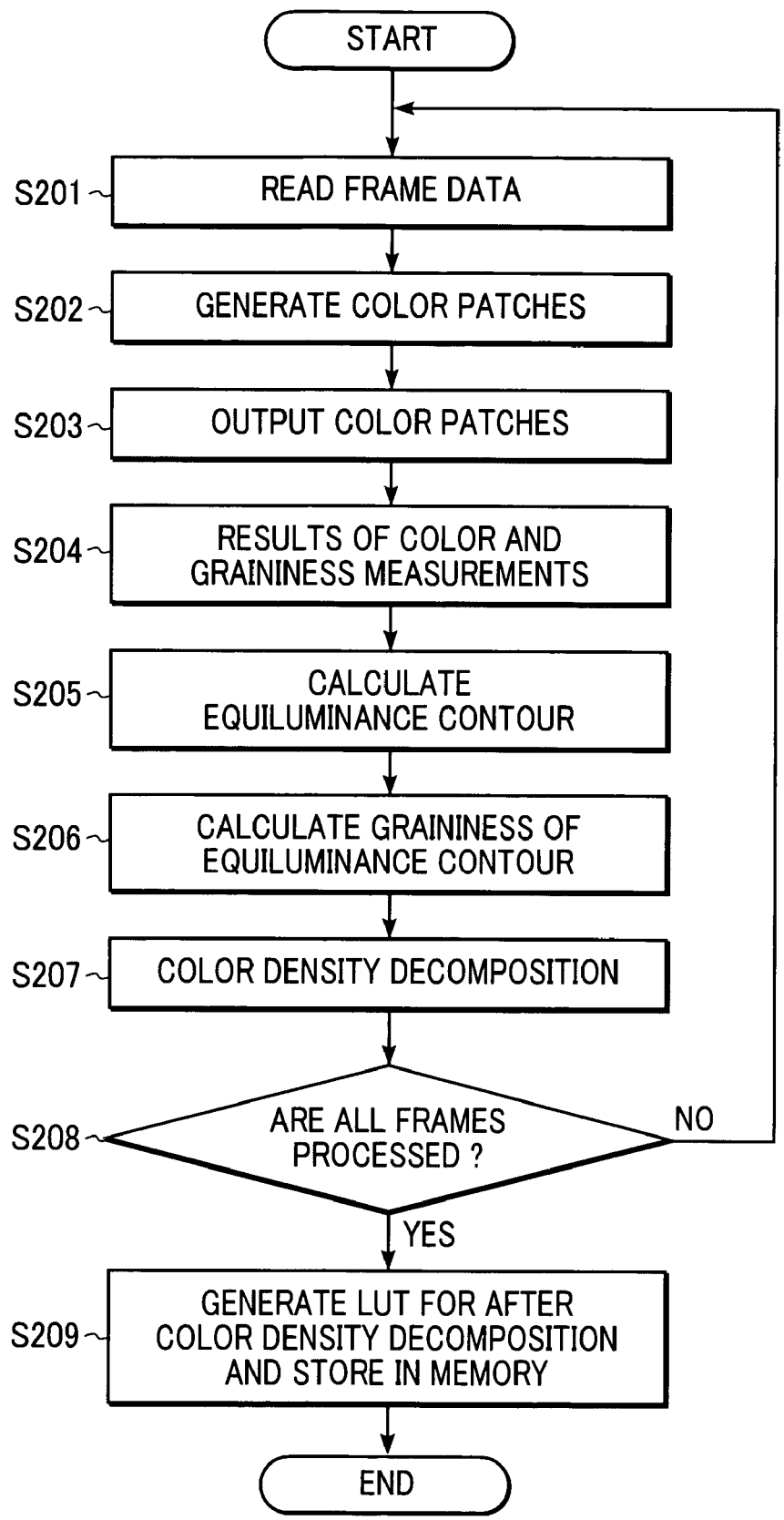

IMAGE PROCESSING FOR OPTIMAL COLOR DENSITY DECOMPOSITION BASED ON CALCULATED GRAININESS AND EQUILUMINANCE CONTOURS

BACKGROUND OF THE INVENTION

1. Field of the Invention

The present invention relates to an image processing method and system. More specifically, the invention relates to an image processing method and system that performs optimal color density decomposition.

2. Description of the Related Art

There are many different types of known data output systems such as word processors, personal computers, and facsimile devices. Among these known data output systems is an ink jet printer, which records text and images on a recording medium by discharging a colorant onto the recording medium. The performance of inkjet printers has been improved recently and these inkjet printers are capable of high quality recording of, not only text, but also color images.

An inkjet printer records intermediate tones of color by controlling the spatial distribution of ink dots discharged from printer heads. However, for regions with a low dot concentration, i.e., the highlights of the image, the dots appear grainy.

Japanese Patent Laid-Open No. 2002-059571 discloses a system for reducing the graininess of highlights by using light-colored ink (light cyan (Lc) and light magenta (Lm)) in addition to the basic four colors: cyan (C), magenta (M), yellow (Y), and black (K).

Specifically, cyan is separated into a light cyan (Lc) ink and a dark (regular) cyan (C) ink, a process referred to as 'color density decomposition.' Color density decomposition is based on empirical assumptions that "the lighter the background, the more the dark cyan stands out" and that "it is better to use light colored ink in the vicinity of the highlight." However, graininess of the printed images is not always reduced indicating that optimal color density decomposition has not been achieved.

SUMMARY OF THE INVENTION

The present invention addresses one or more of the aforementioned drawbacks and disadvantages of the related art by providing a system that sufficiently controls graininess when carrying out color density decomposition. The present invention can also be employed to perform color density decomposition while sufficiently controlling the graininess by performing the color density decomposition in accordance with the granularity of color patches.

According to one aspect of the present invention, calorimetric values and graininess of the color patches formed by an image-output system are determined, equiluminance contours are calculated based on the colorimetric values and the graininess of the contours, and color density decomposition is performed in accordance with the equiluminance contours and the graininess.

Another aspect of the present invention, a new method for color density decomposition by taking graininess into consideration is provided.

According to another aspect of the present invention, an image processing system that includes a number of components is provided. These components include a generating unit that generates color patch data based on data on a recording agent used for the formation of an image. The generating unit outputs the color patch data to an image forming system. Another component of the image processing system includes a calorimetric unit that performs color measurement and graininess measurement of color patches, which are formed using light and dark recording agents. Other components of the image processing system are a calculating unit and a separation unit. The calculating unit calculates equiluminance contours by using results of the color measurement while the separating unit performs color density decomposition according to the equiluminance contours and the results of the graininess measurement and wherein amounts of light and dark recording agents is determined, that is, the optimal mix of light cyan Lc ink and dark cyan C ink is determined.

Further features and advantages of the present invention will become apparent from the following description of the embodiments (with reference to the attached drawings).

BRIEF DESCRIPTION OF THE DRAWINGS

FIG. 2 is a flow chart describing the image processing performed by the image processing system of the present invention.

DETAILED DESCRIPTION OF THE INVENTION

Figure 1:
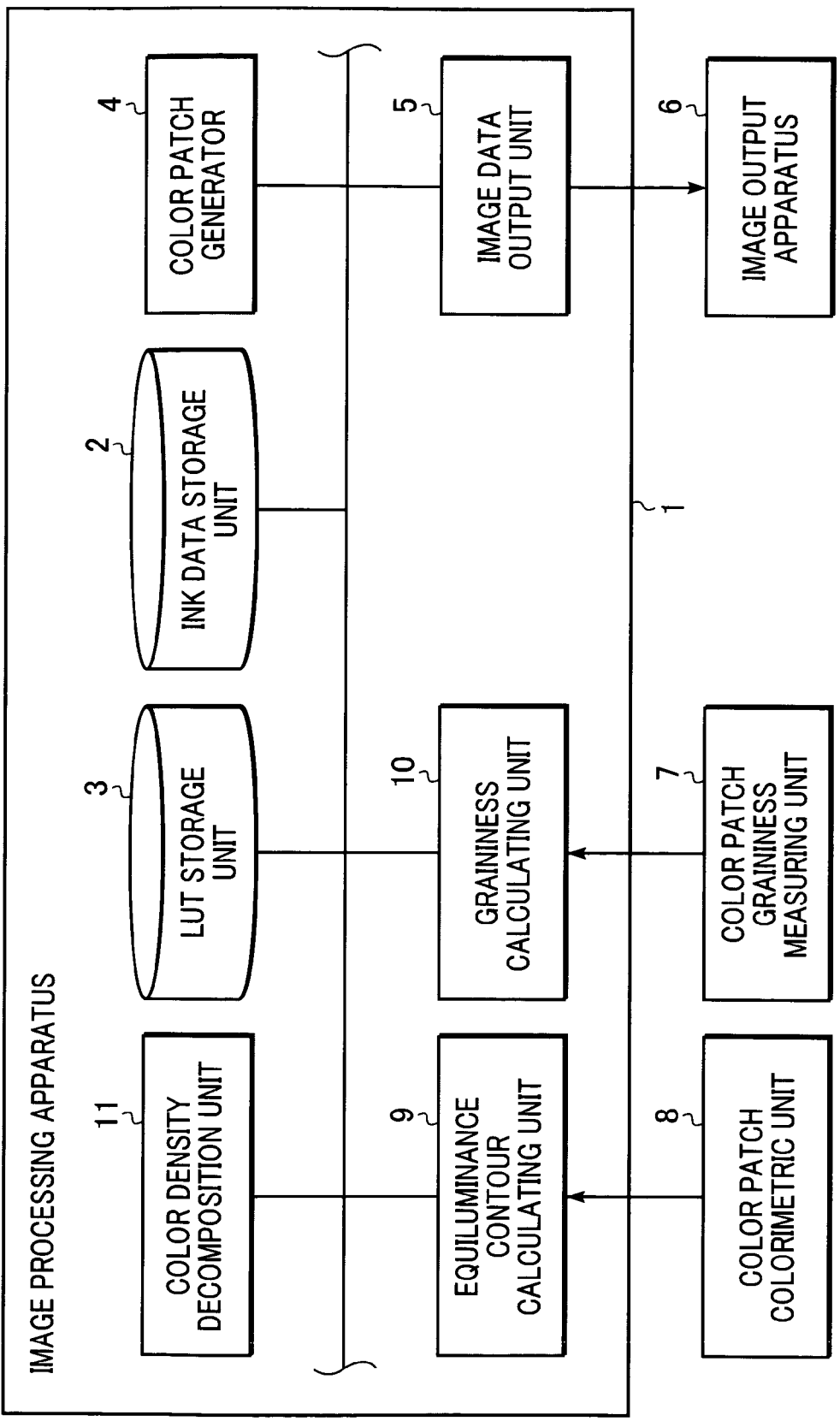
FIG. 1 is a block diagram illustrating the structure of an image processing system according to a first embodiment of the present invention.

Image processing according to embodiments of the present invention will be described in detail by referring to the drawings.

First Embodiment

Structure

FIG. 1 is a block diagram illustrating an image processing apparatus 1 according to a first embodiment of the present invention. The processing of the image processing apparatus 1 is performed by running a program on a CPU, wherein the program is stored on a RAM (not shown in the drawing) included in the image processing apparatus 1.

The image processing apparatus 1 is connected to a color patch graininess measuring unit 7 and an image output apparatus 6 of a color patch colorimetry unit 8. A recording agent (ink or toner) data storage unit 2 stores data on the type and the calorimetric value of the recording agent used for the image output. A lookup table (LUT) storage unit 3 stores color separation LUTs for before and after color density decomposition. A color patch generator 4 uses the ink (recording agent) data stored in the ink data storage unit 2 and the before decomposition LUT data in the LUT storing unit 3 to generate color patch data. An image data output unit 5 sends the color patch data generated by the color patch data generator 4 to the image output apparatus 6. An equiluminance contour calculating unit 9 calculates the equiluminance contours (cf. FIG. 5A) from the colorimetric values of the color patches measured by a color patch colorimetry unit 8. A graininess calculating unit 10 uses the graininess of the color patches obtained by the color patch graininess measuring unit 7 to calculate the graininess of the equiluminance contours calculated by the equiluminance contour calculating unit 9. A color density decomposition unit 11 uses the calorimetric values of the color patches obtained by a color patch colorimetry unit 8 and the graininess of the color patches measured by the color patch graininess measuring unit 7 to perform color density decomposition using the before decomposition data LUT data stored in the LUT storage unit 3.

The image output apparatus 6 may be an inkjet printer or an electrophotographic printer for printing an image according to the data received from the image data output unit 5. The color patch graininess measuring unit 7 may be a CCD camera or a scanner for measuring the graininess of the color patches output from the image output apparatus 6.

The color patch colorimetry unit 8 may be a spectrophotometer for measuring the color of the color patches output from the image output apparatus 6.

Processing

FIG. 2 is a flow chart describing image processing by the image processing apparatus 1. In the following description, the term 'ink' is used to refer to a recording agent. In addition, when the image output apparatus 6 is an electrophotographic printer, toner is used as a recording agent. Therefore, in the following description, the term 'ink' may be replaced with 'toner.'

Figure 3A:
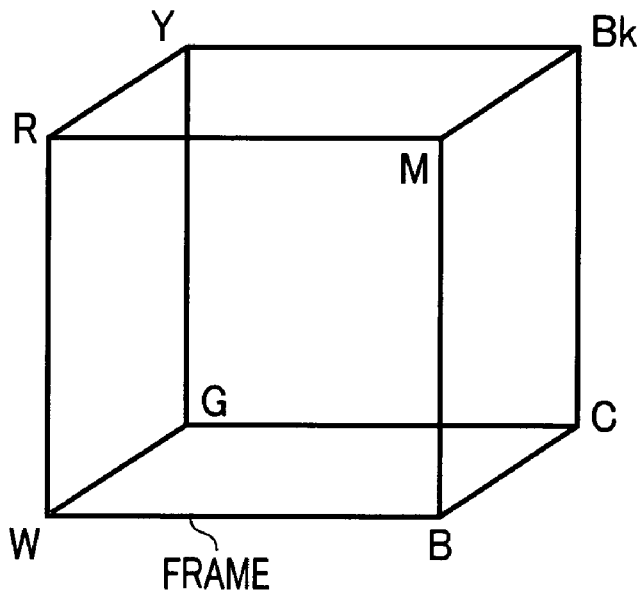
FIG. 3A illustrates frame data for use with an embodiment of the present invention.
Figure 3B:
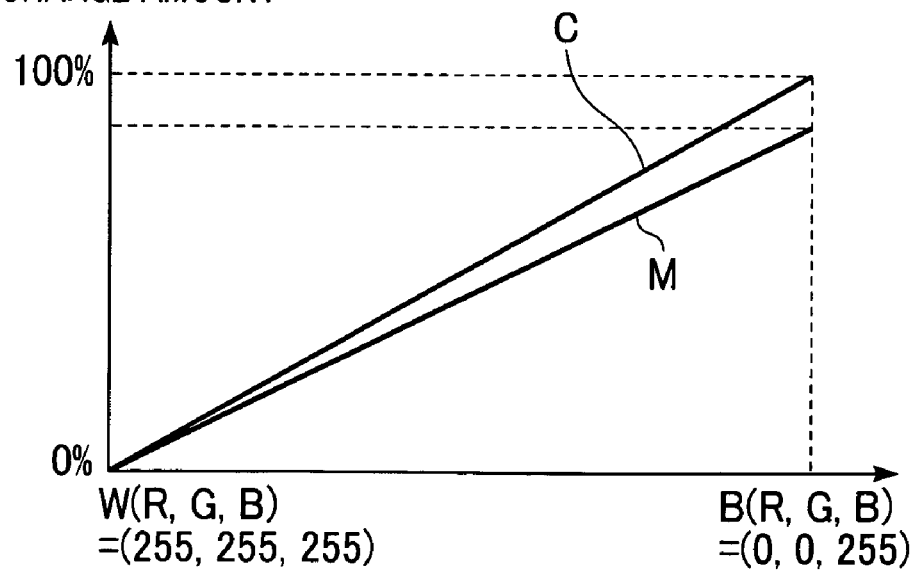
FIG. 3B illustrates the results of separating the frame data into two colors of ink (toner).

Frame data for before color density decomposition stored in the LUT storage unit 3 is sent to the color patch data generator 4 (S201). Frame data is obtained as a result of performing color separation on a frame (one of the edges defining an RGB space such as the edge from white (W) to red (R), white (W) to green (G), or yellow (Y) to black (Bk)) (cf. FIG. 3B), as illustrated in FIG. 3A.

Figure 4:
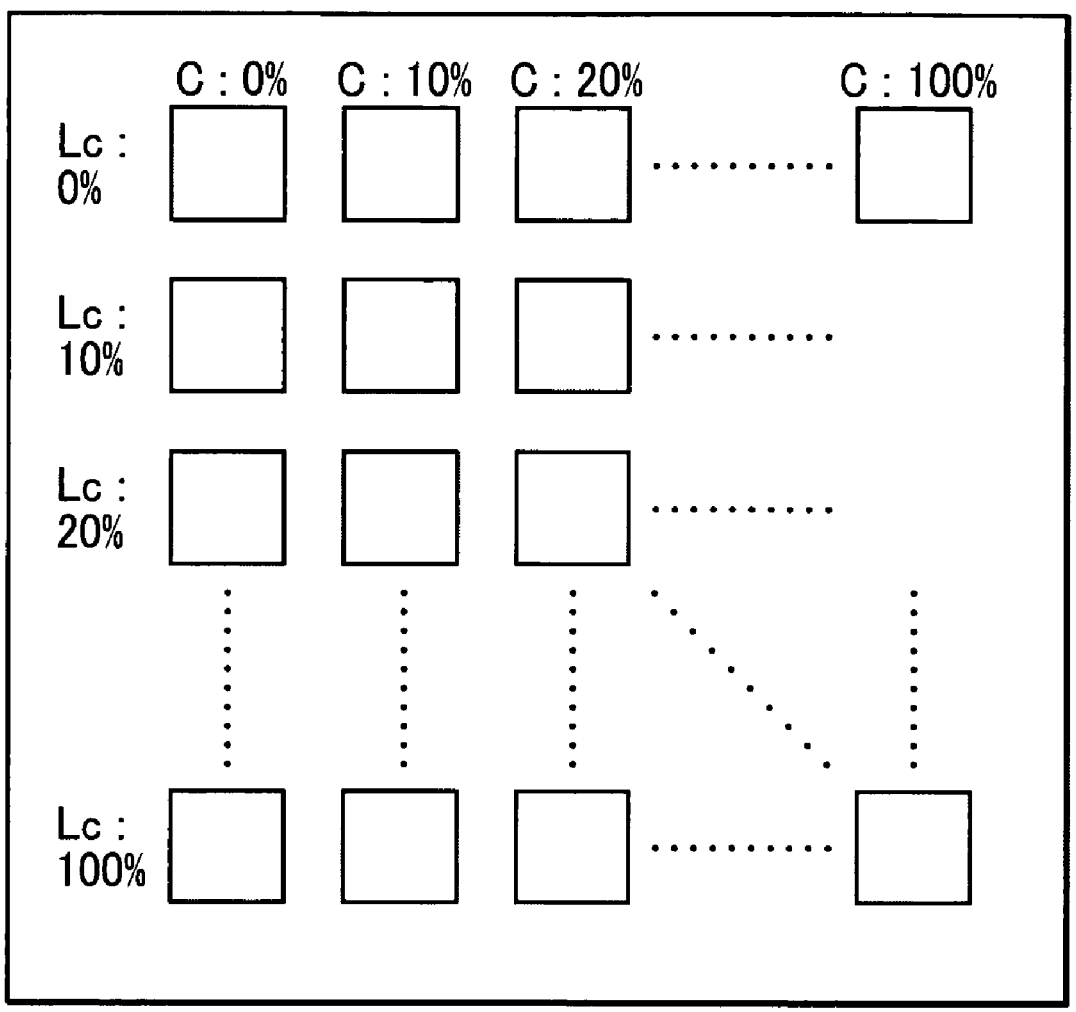
FIG. 4 illustrates color patches in accordance with an embodiment of the present invention.

Next, by using the frame data and the ink data stored in the ink data storage unit 2, the color patch data generator 4 generates color patch data, as illustrated in FIG. 4, showing the change in the amount of dark-colored ink discharged in the x direction and the change in the amount of light-colored ink discharged in the y direction (S202). The color patch data is sent to the image output apparatus 6 via the image data output unit 5 for printing (S203).

FIG. 4 illustrates an example of color patches for dark cyan C ink and light cyan Lc ink.

Figure 5A:
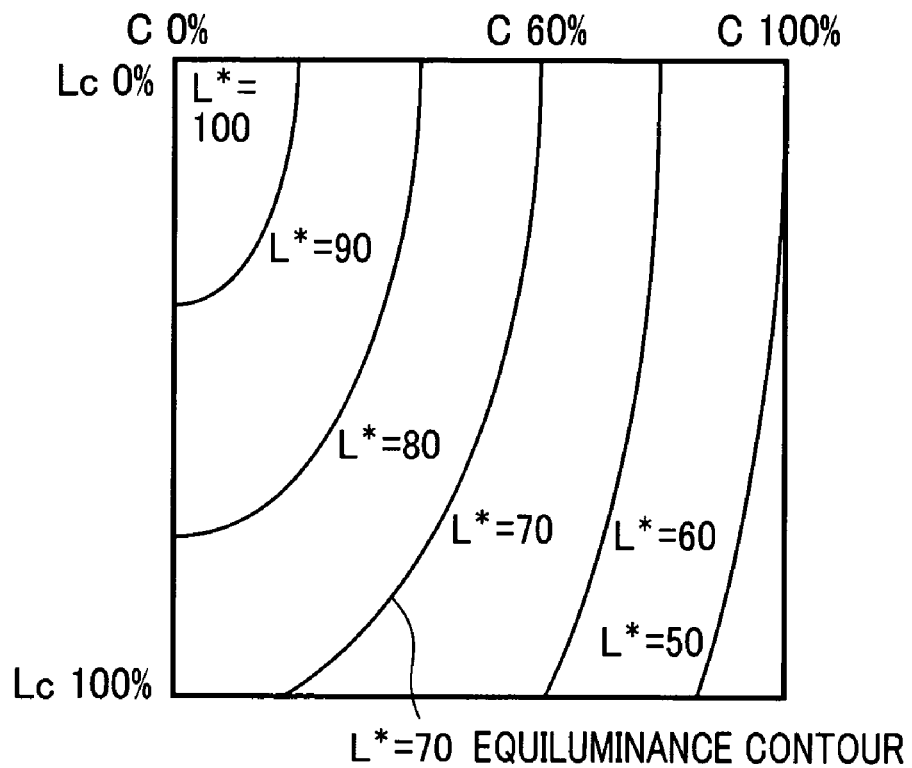
FIG. 5A illustrates equiluminance contours as determined by one embodiment of the present invention.
Figure 5B:
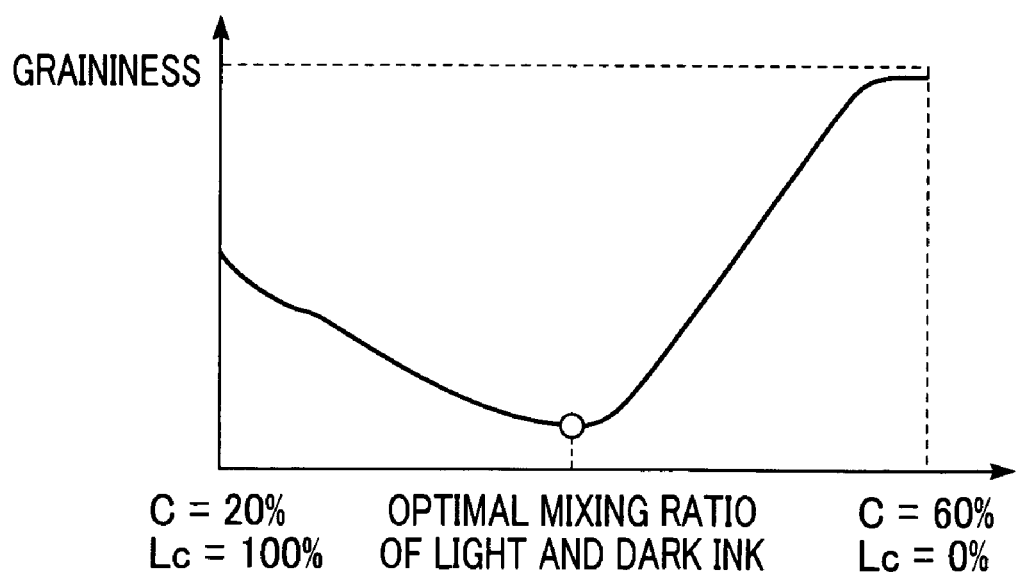
FIG. 5B illustrates the graininess of an equiluminance contour of FIG. 5A.

The color patch colorimetry unit 8 sends out the calorimetric values of the printed color patches and the color patch graininess measuring unit 7 sends out the graininess of the color patches (S204). By using the calorimetric values of the color patches, the equiluminance contour calculating unit 9 calculates the equiluminance contours (the contour lines indicating regions of the color patches having the same luminosities), as illustrated in FIG. 5A (S205). L* represents the luminance in an L*a*b* or L*u*v* space according to the Commission Internationale de l'Eclairage (CIE). L*, however, may represent the luminance of other color spaces. The graininess calculating unit 10 calculates the graininess on the equiluminance contours (S206), as shown in FIG. 5B, and the color density decomposition unit 11 updates the frame data according to the mixing ratio of the light and dark ink that has the least graininess on each equiluminance contour (S207); in other words, the color density decomposition unit 11 performs color density decomposition.

FIG. 5A illustrates the equiluminance contours of a mixture of dark cyan C and light cyan Lc. FIG. 5B illustrates the graininess on the L*=70 equiluminance contour depicted in FIG. 5A. The best mixing ratio of the light and dark ink is the mixing ratio in which the graininess for a particular luminance (L*=70 in the case above) is minimized. In this way, the mixing ratio of dark and light cyan ink that has the least graininess at a luminance of L*=70 when printed by the image output apparatus 6 can be determined.

Then, the image processing apparatus 1 determines whether color density decomposition for all frames has been completed. More specifically, the image processing apparatus 1 determines whether the equiluminance contours have been calculated, as illustrated in FIG. 5A, and whether the frame data has been updated according to the graininess of the equiluminance contours, as illustrated in FIG. 5B. After color density decomposition is completed for all of the frames, a color separation LUT is generated after color density decomposition by interpolating the color separation results of the frame surfaces (the surfaces of the color space excluding the frame edges, such as the surface Y-G-R-W) according to previously obtained frame data. The data on a frame surface is interpolated based on previously-obtained data on the plurality of frames adjoining this frame surface (or the data on the frame surfaces that has been interpolated, if this data has already been obtained). The color separation LUT obtained in this way is stored in the LUT storage unit 3 (S209). If an unprocessed frame is present, the process is returned to Step S201 to read the unprocessed frame data for color density decomposition.

As described above, graininess is measured for the actual printed results (color patches) obtained by using light and dark colored ink. Then, the light and dark ink mixing ratio required to produce the least graininess is determined. According to this mixing ratio, color density decomposition is performed and a color separation LUT is generated. Consequently, an optimized color separation LUT having the least graininess for each level of luminosity is obtained. By applying the above-mentioned process, RGB image data separated into C (cyan), M (magenta), Y (yellow), and K (black) for printing can be further separated into C (dark cyan), M (dark magenta), Y (yellow), K (black), Lc (light cyan), and Lm (light magenta), and an LUT for separating C and M into light and dark colors can be generated.

Second Embodiment

Image processing according to second embodiment of the present invention is now described below. In this embodiment, components substantially identical to those of first embodiment are indicated by the same reference numerals and their descriptions are omitted.

Structure

Figure 6:
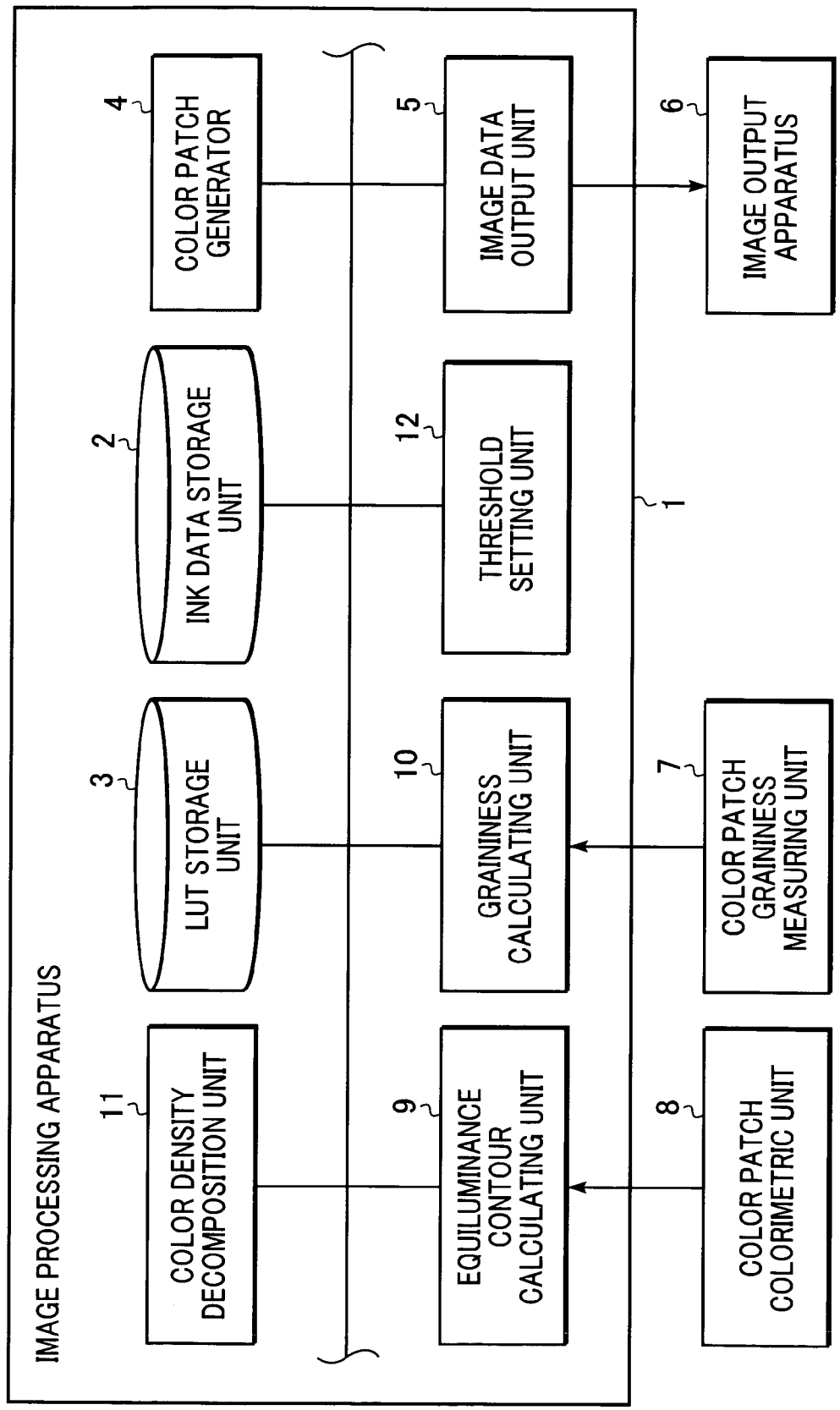
FIG. 6 is a block diagram illustrating the structure of an image processing system according to a second embodiment of the present invention.

FIG. 6 is a block diagram illustrating the structure of an image processing apparatus according to a second embodiment of the present invention. In FIG. 6, a threshold setting unit 12 for setting a graininess threshold for the light and dark ink mixing ratio obtained by the color density decomposition unit 11 is shown. As noted, the color density decomposition unit performs color density decomposition of a color separation LUT for before performing color density separation stored in the LUT storage unit 3.

Processing

In response to the color density decomposition (S207) according to second embodiment, the frame data is updated based on the light and dark ink mixing ratio having the least graininess within the graininess threshold set by the threshold setting unit 12 and having the highest proportion of regular (dark) ink.

Figure 7:
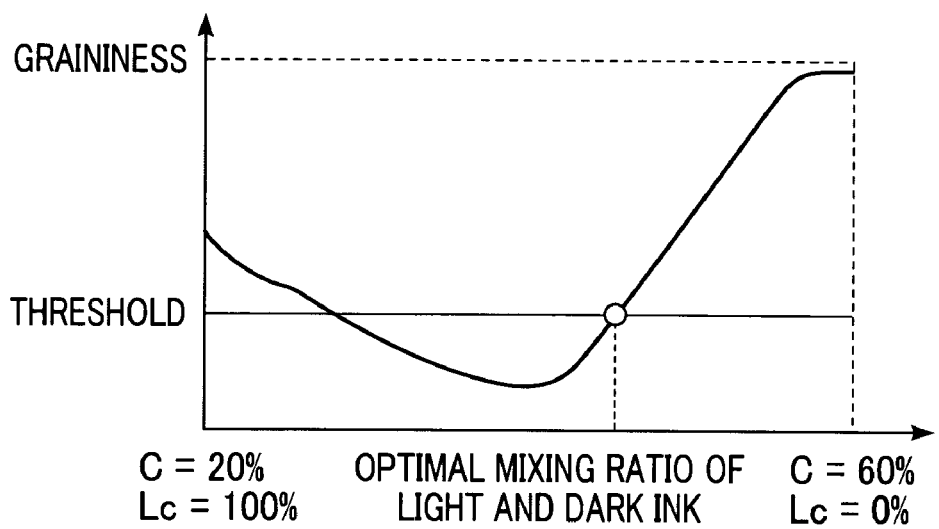
FIG. 7 illustrates a method for determining the optimal mixing ratio of light and dark ink by applying a threshold limit for graininess according to an embodiment of the present invention.
Figure 8:
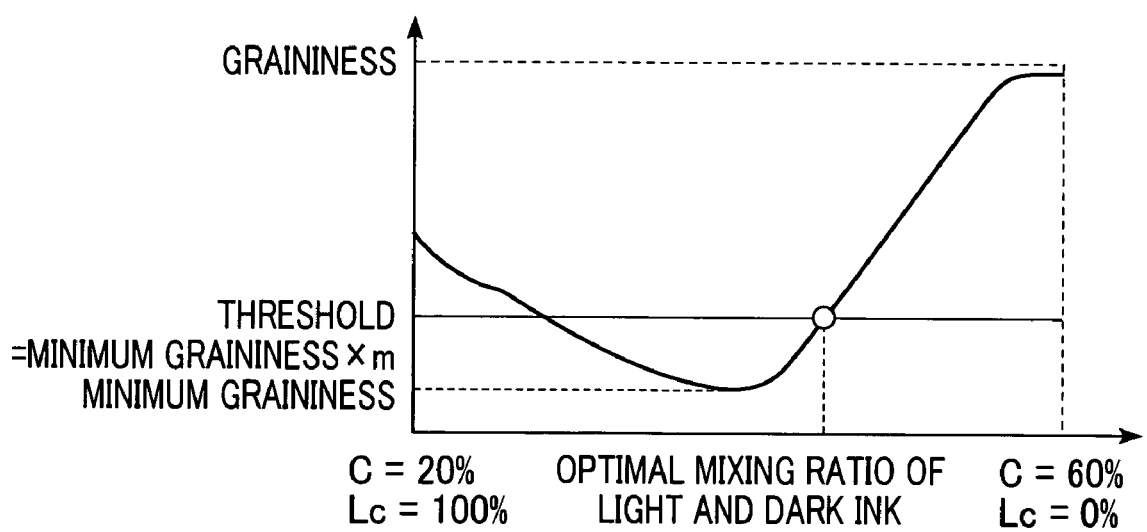
FIG. 8 illustrates a method for setting a threshold limit for graininess according to an embodiment of the present invention.

The graininess threshold is a visual limit of graininess (i.e., an image will not appear grainy to the human eye if the graininess is below the threshold). As illustrated in FIG. 7, a light and dark ink mixing ratio within the visual limit (threshold) having the highest proportion of regular (dark) ink is determined. As illustrated in FIG. 8, the threshold may be set as m (m≧1.0) times the minimum graininess of the equiluminance contour.

In this way, an optimized color separation LUT for an ink mixture that has the highest proportion of regular (dark) ink and the lowest proportion of light ink (i.e., an ink mixture that has the lowest printing cost) within the graininess threshold for each luminosity can be obtained.

Graininess

In the above-mentioned embodiments, the graininess of the color patches may be determined by the following formula for root mean square (RMS) granularity (the standard deviation of the change in concentration (luminosity) of the ink and the smaller the value of this standard deviation, the lesser the graininess). Graininess may also be determined by calculating the RMS granularity after the modulation transfer function (MTF) (cf. "*dejitaru kara gazo no kaiseki hyoka*," p. 69-72, Yoichi Miyake) for the human visual system is multiplied by the original image (an image of the color patches taken by the color patch measuring unit 8) to determine a graininess suitable for the characteristics of the human visual system.

$$RMS \text{ granularity} = \Sigma_x \Sigma_y \{f(x,y) - \text{fave}\}^2/n\}$$

wherein $f(x,y)$ is the concentration (or luminosity) of the patch in position $(x,y)$, wherein fave is the average concentration (or average luminosity) of all the pixels in a patch, and wherein n is the number of pixel in a patch.

Preparation of Color Patches

Figure 9:
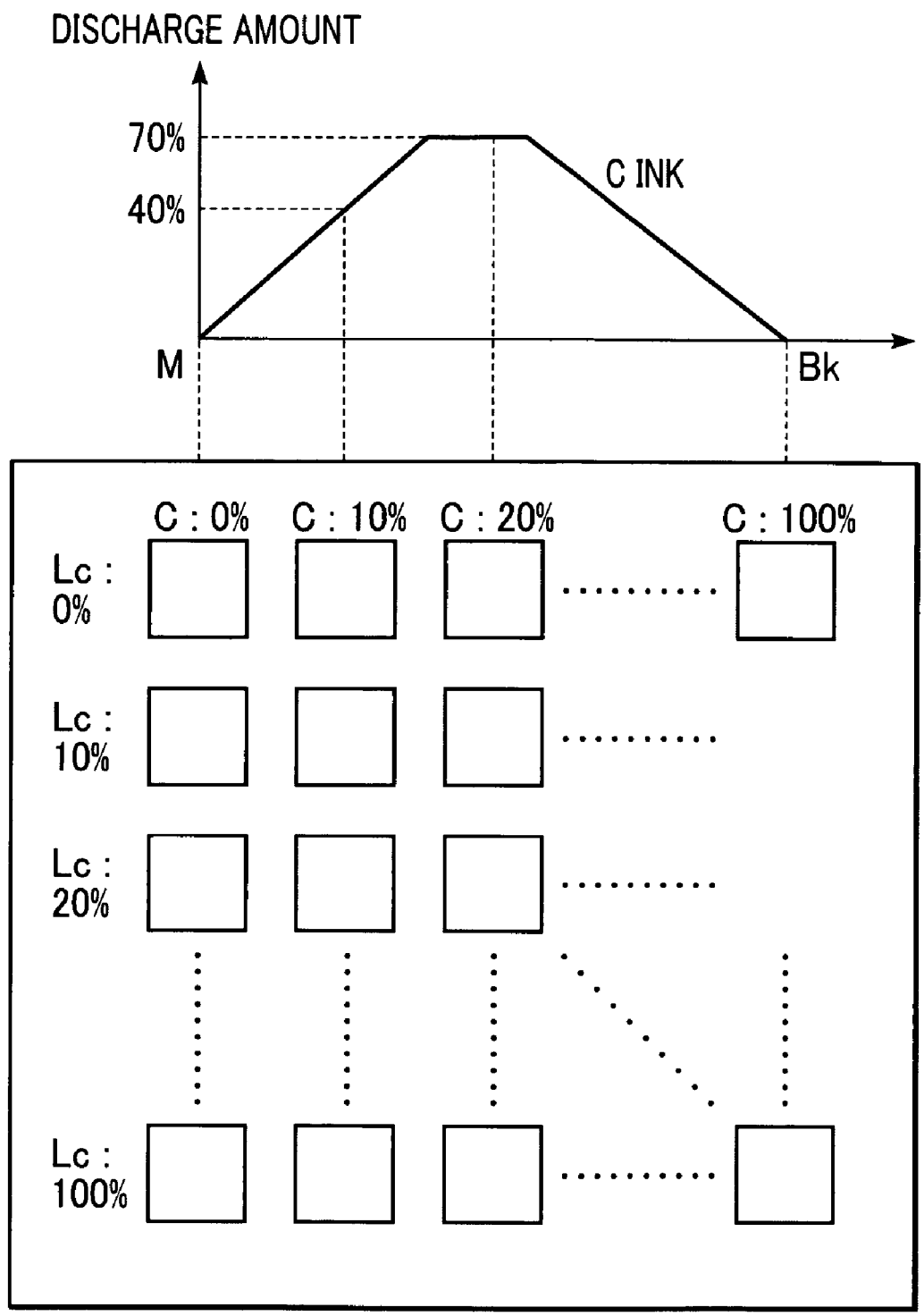
FIG. 9 illustrates a method for forming color patches according to an embodiment of the present invention.
Figure 10:
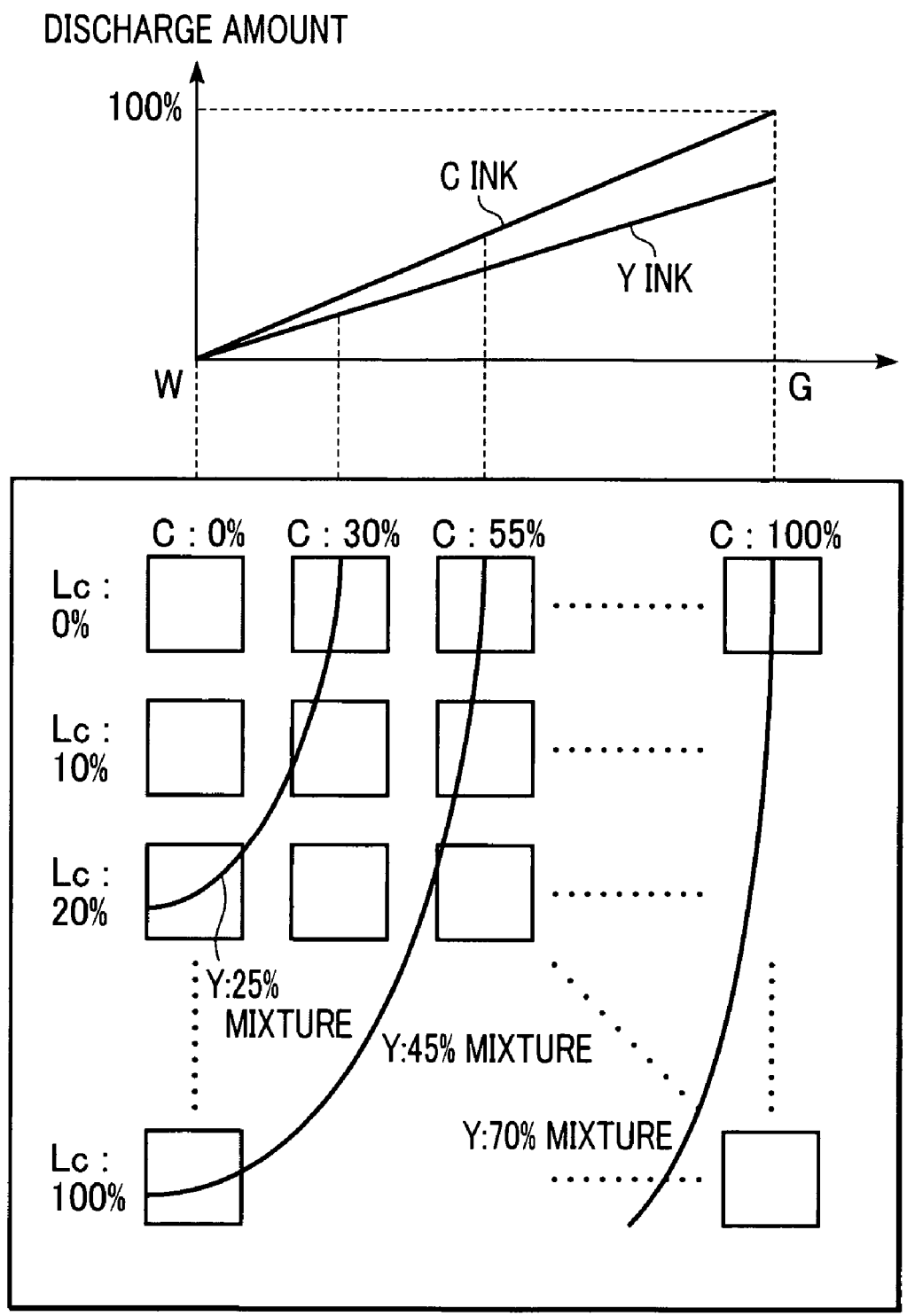
FIG. 10 illustrates a method for forming color patches according to an embodiment of the present invention.

In the above-mentioned embodiments, the color patches do not necessarily have to indicate a linear and continuous increase in the amounts of light and dark ink discharged, as illustrated in FIG. 4, and may change the way of indicating the amount of ink discharged according to the input frame data. For example, when the input frame data is as illustrated in the upper portion of FIG. 9, the color patches may be arranged so that the discharge amount of regular (dark) ink discharged increases and then decreases, as illustrated in the lower portion of FIG. 9. As illustrated in the upper portion of FIG. 10, if the input frame data includes a mixture of ink that cannot be separated into light and dark ink (Y ink in FIG. 10) in addition to the ink that is separated into light and dark ink (C ink in FIG. 10), the data is output as color patches. Then, according to the equiluminance contours of the color patches, color patches including the Y ink, as illustrated in the lower portion of FIG. 10, should be reprinted. In this way, the graininess can be determined with higher accuracy.

Depending on the combination of the image output apparatus 6, the ink and the medium (paper), there might be a limit on the total amount of ink that can be discharged. In such a case, a limitation may be set so that the total amount of discharged ink does not exceed the limited amount set by the user or the limited amount determined by the combination of the image output apparatus 6, ink, and medium.

Consistency Between Sampling Points within a Frame

Figure 11A:
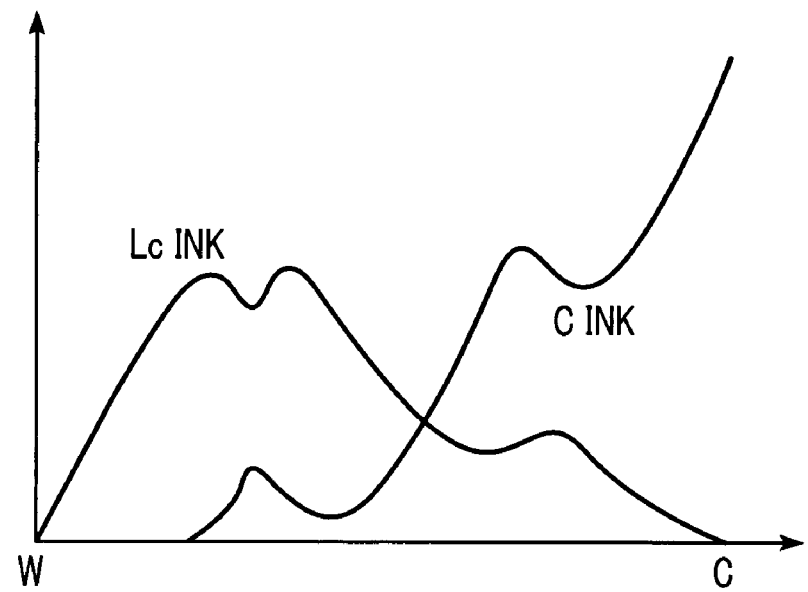
FIG. 11A illustrates the consistency between each sampling point within a frame according to an embodiment of the present invention.
Figure 11B:
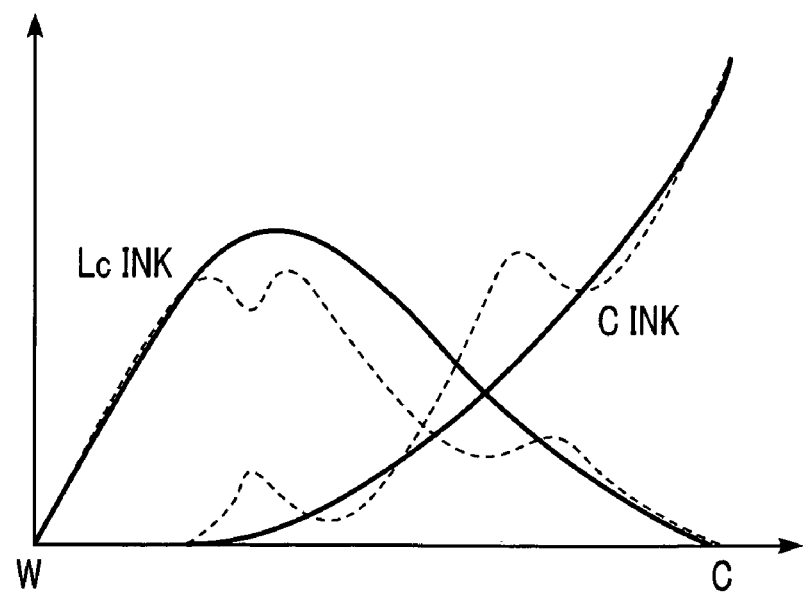
FIG. 11B illustrates an example of the result of color density decomposition when restrictive conditions are set within a frame according to an embodiment of the present invention.

In the above-mentioned embodiments, if color density decomposition is performed on each of the sampling points within the frame so that each sampling point is optimized individually, the results may not be consistent in some cases, as illustrated in FIG. 11A. To solve this problem, the curves in FIG. 11A can be converted into smooth curves such as in FIG. 11B by applying the result of the color density decomposition of another sampling point and by imposing a restriction that "the amount of light ink discharged increases and then decreases" through a user interface (not shown in the drawings) connected to the image processing apparatus 1.

Other Embodiments

The present invention may be applied to a system composed of a plurality of units, such as a host computer, an interface unit, a reader, or a printer, or may be applied to an apparatus including only one unit, such as a copy machine or a facsimile.

The present invention may also be achieved by a computer (CPU or MPU) of a system or a system receiving the codes of a software program for realizing the functions of the embodiments of the present invention stored on a storage medium (or recording medium) and then the computer executing the program codes. In this case, the program codes realize the functions of the embodiments and the storage medium storing the program codes fall within the present invention. The functions according to the embodiments are realized not only by executing the program codes read out the computer, but also by the operating system (OS) operating on the computer carrying out part or all of the processes commanded by the program codes.

The functions according to the embodiments can also be realized by writing the program codes read out from a storage medium onto a memory included in a function enhancement card or a function enhancement unit and then carrying out part or all of the processes commanded by the program codes by a CPU included in the card or the unit.

When the present invention is applied to the above-mentioned storage medium, the storage medium stores the program codes corresponding to the flow chart process described above.

As described above, color density decomposition can be performed according to the graininess of the color patches.

Consequently, the graininess of the color patches can be reflected onto the color density decomposition.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

CROSS-REFERENCE TO RELATED APPLICATIONS

This application claims priority from Japanese Patent Application No. 2003-282856 filed Jul. 30, 2003, which is hereby incorporated by reference herein.

What is claimed is:

1. An image processing system, comprising:
a generating unit that generates color patch data based on data on a recording agent used for the formation of an image, wherein the generating unit outputs the color patch data to an image forming system;
a calorimetric unit that performs color measurement and graininess measurement of color patches formed with light and dark recording agents by the image forming system;
a calculating unit for calculating equiluminance contours by using results of the color measurement; and
a separating unit that performs color density decomposition according to the equiluminance contours and the results of the graininess measurement and for determining the amount of light and dark recording agents.

2. The image processing system according to claim 1, wherein the separating unit entirely or partially replaces the dark recording agent with the light recording agent during color density decomposition.

3. The image processing system according to claim 1, wherein the separating unit is capable of determining a proportion of dark and light recording agents having the least graininess.

4. The image processing system according to claim 1, wherein the separating unit is capable of determining, during color density decomposition, a proportion of light recording agent in accordance with a proportion of dark recording agent having a graininess not exceeding a visual limit.

5. The image processing system according to claim 1, wherein the separating unit is capable of determining a proportion of dark recording agent so that its graininess is a predetermined multiple ($\geq 1$) of the least graininess of the equiluminance contour.

6. The image processing system according to claim 1, wherein the graininess of the color patches is determined by measuring the root mean square (RMS) granularity of the color patches.

7. The image processing system according to claim 1, wherein the graininess of the color patches is determined by calculating the product of the RMS granularity of the color patches and the modulation transfer function (MTF), which is a visual characteristic of the human eye.

8. A method for image processing, comprising the steps of:
generating color patches by using light and dark recording agents;
measuring color and graininess of the color patches;
calculating equiluminance contours according to a result of the color measurement; and
performing color density decomposition in accordance with the equiluminance contours and the graininess measurement.

9. A method for image processing according to claim 8, wherein the step of generating color patches by using light and dark recording agents comprises entirely or partially replacing the dark recording agent with the light recording agent.

10. A method for image processing according to claim 8, wherein color density decomposition comprises determining a proportion of dark and light recording agents having the least graininess.

11. A method for image processing according to claim 8, wherein the color density decomposition is a process in which a proportion of light recording agent is determined in accordance with a proportion of dark recording agent having a graininess not exceeding a visual limit.

12. A method for image processing according to claim 8, wherein the color density decomposition is a process in which a proportion of dark recording agent is determined so that its graininess is a predetermined multiple ($\geq 1$) of the least graininess of the equiluminance contour.

13. A method for image processing according to claim 8, wherein the graininess of the color patches is determined by measuring the RMS granularity of the color patches.

14. A method for image processing according to claim 8, wherein the graininess of the color patches is determined by calculating the product of the RMS granularity of the color patches and the modulation transfer function (MTF), which is the visual characteristic of the human eye.

15. A computer readable medium storing a program, the program comprising:
codes for inputting the results of color measurement and graininess measurement of color patches formed with light and dark recording agents by an image forming system;
codes for calculating equiluminance contours according to the results of the color measurement; and
codes for carrying out color density decomposition in accordance with the equiluminance contours and the result of the color measurement.

* * * * *